US009300787B1

(12) United States Patent
Khameneh

(10) Patent No.: US 9,300,787 B1
(45) Date of Patent: Mar. 29, 2016

(54) AUGMENTED DEVICE INTERACTION THROUGH SERVICES

(71) Applicant: Amazon Technologies, Inc., Reno, NV (US)

(72) Inventor: Shawn Jafar Khameneh, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 190 days.

(21) Appl. No.: 14/040,301

(22) Filed: Sep. 27, 2013

(51) Int. Cl.
*H04M 3/42* (2006.01)
*H04M 1/725* (2006.01)

(52) U.S. Cl.
CPC .................... *H04M 1/72583* (2013.01)

(58) Field of Classification Search
CPC .............................. H04W 76/02; H04W 92/18
USPC ........................................................ 455/414.1
See application file for complete search history.

(56) References Cited

U.S. PATENT DOCUMENTS

| | | | | |
|---|---|---|---|---|
| 2008/0139228 A1* | 6/2008 | Raffel et al. | ................ | 455/466 |
| 2009/0080411 A1* | 3/2009 | Lyman | ................ | 370/352 |
| 2009/0104954 A1* | 4/2009 | Weber | ................ | G07F 17/32 463/1 |
| 2009/0215476 A1* | 8/2009 | Tysowski | ................ | 455/466 |
| 2009/0292799 A1* | 11/2009 | Eisener et al. | ................ | 709/223 |
| 2010/0262828 A1* | 10/2010 | Brown | ................ | H04L 9/0844 713/171 |
| 2010/0274634 A1* | 10/2010 | Ifrah | ................ | G06Q 10/063 705/7.11 |
| 2013/0169434 A1* | 7/2013 | McCown | ................ | G08B 21/00 340/540 |
| 2014/0153705 A1* | 6/2014 | Moore | ................ | H04M 3/42391 379/88.14 |

* cited by examiner

*Primary Examiner* — Qun Shen
(74) *Attorney, Agent, or Firm* — Kilpatrick Townsend & Stockton LLP

(57) ABSTRACT

Techniques may be provided for augmenting a call initiated by a first user device with functionality that enables the first user device to automatically interact with at least one other user device using one or more augmented services. In some examples, a service provider may receive information that identifies a connection between the first device and a second device. Additionally, an identifier of the first device may be received. Based at least in part on the identifier, the service provider may identify an augmented service capable of being implemented by the first device. Additionally, the service provider may enable implementation of the augmented service by the first device and the second device.

21 Claims, 9 Drawing Sheets

AUGMENTED DEVICE INTERACTION THROUGH SERVICES

BACKGROUND

As mobile devices become more widespread and advanced, more and more users turn to them for enabling a multitude of different functions, features, and/or software applications. In addition, mobile devices have become both location and context aware. For example, mobile devices may be configured to provide services that detect a geographic location as well as other pertinent contextual information that may aid in the software application functionality being implemented.

In some examples, mobile devices may provide various services such as text messaging, video messaging/calling, voice messaging/calling, and/or location determining services to users. However, a user may typically not be aware of the types of services that can be accessed by another user of a mobile device and/or the types of services to which the other user has subscribed. Additionally, a user may find it difficult to access such services without excessive effort. As more and more users are beginning to use these different types of services on their mobile devices, managing device functionality may pose challenges to users as well as service providers.

BRIEF DESCRIPTION OF THE DRAWINGS

Various embodiments in accordance with the present disclosure will be described with reference to the drawings, in which.

DETAILED DESCRIPTION

Figure 1:
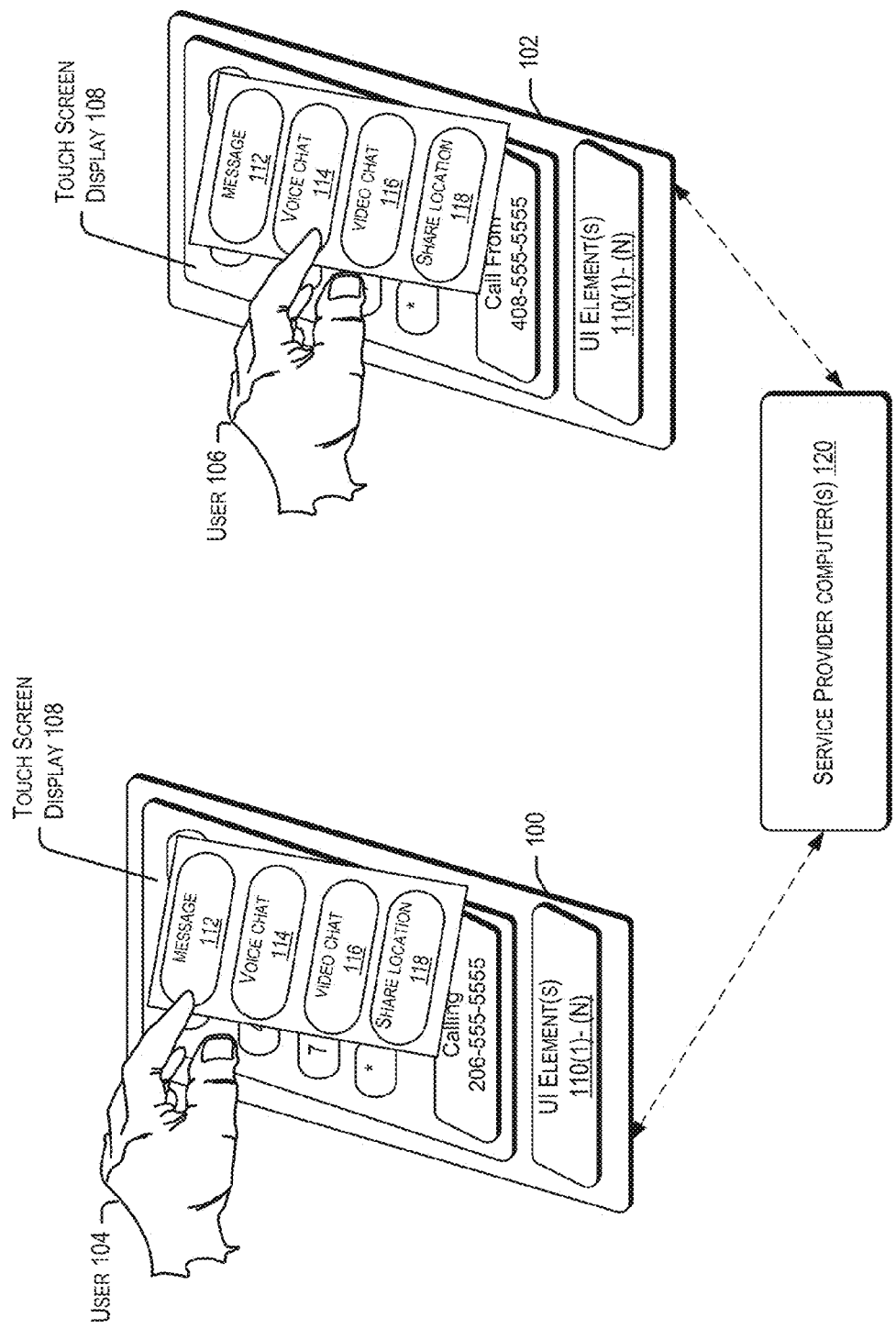
FIG. 1 illustrates an example interaction in which users of user devices interact with one another using one or more services as described herein.

In the following description, various examples will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, augmenting a call initiated by a user of a first user device with functionality that enables the user to interact with at least one other user of a second user device using one or more services provided to the users by the devices and/or by a service provider. In some examples, the types of services may include, for example, a video chat service, a voice chat service, a text messaging service, a location sharing service, a social networking service, or the like. In some examples, the user devices may include, but are not limited to, a mobile phone, a tablet, an e-book reader, an mp3 player, a remote control, a game console or controller, a laptop, or any other computing device. As used herein, a service provider may include an entity configured to provide communication services (e.g., a cellular or other voice/telephone service) and/or data network services. Additionally, in some examples, a service provider may refer to an entity configured to enable augmented services utilizing one or more communication services, one or more data networks (e.g., private and/or public networks), or hardware and/or software of the user devices. As such, the service provider may be configured to manage an initial call that may be augmented, provide the augmenting capabilities, or both.

In certain embodiments, a user of a first device may initiate a call with another user of a second device, wherein the devices are connected via a wireless service provider network (e.g., a cellular network provider or the like) that offers transmission services such as a cellular telephone service, a personal communication service and the like, to the users of the devices. In some embodiments, a user of first device may also initiate a call with another user of a second device utilizing a voice call (e.g., a VoIP call, or the like) to communicate with each other.

In accordance with at least one embodiment, the browsers of the devices may be equipped with capabilities that enable browser based real-time communication between the devices via a peer-t)-peer communications protocol such as Web Real-Time Communication (WebRTC). In such an embodiment, the devices may directly communicate with each other in real-time by utilizing these browser-to-browser applications. As an example, the users of the devices may utilize the browser-to-browser applications to communicate directly with each other for voice calling, video chatting, file sharing and the like.

According to at least one embodiment, upon call initiation (for e.g., utilizing the cellular network provider as discussed above), each device may identify itself to a remote service and/or service provider computer or other entity over a public network such as the Internet by which users can access and/or utilize additional services and by which the users may communicate with each other. In some embodiments, the service provider computer may be a local device accessible by the devices and the devices may communicate with the service provider computer over a local area network (LAN). Identification information associated with the devices may include, for example, the respective phone numbers related to the devices, respective Internet Protocol (IP) address associated with the devices, respective user credentials associated with the users of the devices, or the like. In some embodiments, once a data connection has been established between the devices by the service provider computer, the users may be provided with identification (e.g., via user feedback such as, but not limited to, via a user interface (UI) and/or a voice recognition system) that enables the users to access and/or utilize additional services by which the users may communicate with each other.

In some embodiments, users of devices may register various types of services to which the users subscribe, via an application on the users' devices. In some examples, when a user of a first device initiates a call with a user of a second device, the application may establish communication with a remote service (e.g., a service provider computer) to verify that the users are registered members of the services provided by the service provider computer or by other services (e.g., a video chatting service, a geo-location service, etc.). Upon successful verification, a call initiated by the user of the first device may be augmented with functionality that enables the user of the first device to interact with the user of the second device using one or more services identified by the remote service. Similarly, the second device may be augmented with functionality that enables the user of the second device to interact with the user of the first device, using the services identified by the remote service. In some embodiments, the users may be able to view the services utilized by each other via display screens on the users' devices, respectively. In some examples, the services may be displayed as one or more UI elements that are overlayed on the display screens of the users' devices and the users may interact with each other by selecting one of the displayed services.

Additionally, in some examples, the user devices may be configured to implement functionality associated with the one or more services noted above (e.g., video calls, location services, etc.) without registration with any particular services. For example, a user device may come equipped with a microphone, a camera, a display screen, a global positioning system (GPS) or other geo-location locator device, and may be able to utilize combinations of such equipment to facilitate video calls or the like given the appropriate software or set of instructions. In some embodiments, the user devices may perform one or more operations to send a list of capabilities provided by hardware elements (such as, a microphone, an imaging device, a display screen, a global positioning system (GPS) or other geo-location locator device) of the devices by which the devices may utilize the one or more services to the service provider computer. As such, in some examples, when a user of a first device initiates a call with a second device (e.g., of another user), one or both of the two devices may transmit a signal to the service provider computer to determine if the other user device (or either user) has registered with the service provider computer. Registration with the service provider computer may enable the functionality noted above (e.g., the augmented functionality). If both users are registered with the service provider computer, the service provider computer may then facilitate the augmented functionality by enabling or activating a video session between the two devices, even though user of the first device had initially only placed a call to the user of the second device. In this way, the two users may participate in a video call regardless of whether they have installed or are otherwise associated with any services outside of the service provider computer.

In some aspects, the users may interact with each other using the augmented service, while the call between the users is still in progress through a data connection (e.g., via the wireless cellular service provider network established between the users' of the devices. In other examples, the users may switch to a new data connection provided by the service provider computer to communicate with each other. As an example, the users may switch to a different data connection to communicate via a text service, a voice connection to communicate via a voice service, a video connection to communicate via a video service, etc.

FIG. 1 illustrates an example interaction by which users of user devices may interact with one another using one or more augmented services (as used herein, "augmented services" may include any additional or supplemental services or device functionalities that may be provided by an application and/or from a service provider computer), in accordance with one embodiment of the present disclosure. In some embodiments, the user devices 100, 102 may register with a service provider computer for various types of augmented services to which the users 104, 106 may wish to subscribe. In some examples, the service provider computer may include one or more service provider computer(s) 120 (as shown in more detail in FIG. 2) that provide computing services and/or applications such as, but not limited to, applications that enable the augmented services to be performed by the user devices 100, 102. In some examples, such augmented services may include configuring hardware and/or software of the user devices 100, 102 to enable video calls, text messaging, location sharing, etc., once a call is initiated. Additionally, in some examples, the service provider computer(s) 120 may be configured to receive service registration information provided by the users 104, 106 and verifying that the users 104, 106 are registered members of the services. Additionally, the service provider computer(s) 120 may be configured to provide the users 104, 106 of the devices 100, 102 with applications for purchase and/or download, network information (e.g., web sites), or the like.

User devices 100, 102 may include, but are not limited to, mobile phones, laptops, tablets, electronic book (e-book) readers, mp3 players, gaming consoles or controllers, remote controls, or any other computing device. In some embodiments, a display 108 (e.g., a touch screen display) on the user devices 100, 102 may be configured to manage screen input. In some examples, and as illustrated in FIG. 1, the display 108 may be configured to provide communication functionality between the users 104, 106 to place calls with each other (e.g., cellular calls and/or voice calls). Communication between the users 104, 106 on the user devices 100, 102 may also be facilitated via a keyboard interface that includes a physical keypad in addition to the display 108. In some examples, the communication functionality may be implemented on the user devices 100, 102 by a software program and/or application operating through a processor (and the operating system) of the user devices 100, 102. In other examples, the calling functionality may also be provided by a stand-alone application on the user devices 100, 102.

Additionally, in some examples, the display 108 may also be configured to provide, render, or otherwise display one or more UI elements, 110(1)-(N) (e.g., a hyperlink, an icon that represents a link to electronically stored content, a link or icon that represents content or an application local to devices 100, 102, a link or an icon by which users can share downloaded information over a text message or an email message or other layer of communication, a link to an address book by which users can perform a look up of other users with which they wish to communicate, or the like). According to at least one embodiment, the UI elements 110(1)-(N) may also represent various types of augmented services that may be utilized by the users 104, 106 of mobile devices 100, 102 to communicate with each other. In some examples, the types of augmented services provided by the UI elements 110(1)-(N) may include, for example, a video chat service, a voice chat service, a messaging service, a location sharing service, asocial networking service and the like. In addition, the display 108 may be configured to provide a UI for a specific application or for the OS (e.g., a home screen or the like). For example, the display 108 may render a home screen of the user with icons or other UI elements that indicate software applications or widgets that may be activated by the user.

As illustrated in FIG. 1, in one embodiment, a user 104 operating the user device 100 may interact with a user 106 operating user device 102 by placing a call to the user 106. In some embodiments, upon call initiation, the devices 100, 102 may be configured to perform one or more operations. The operations may include any combination of actions and/or instructions to be performed by one or more processors of the devices 100, 102 in conjunction with at least one or more respective local or remote storage locations associated with the devices 100, 102. In some examples, the operations may include sending respective device identifiers to the service provider computer (s) 120 for verification (e.g., the service provider computer(s) 120 may verify whether the devices sending the identifiers are registered with the service provider computer(s) 120 and, if so, which augmented services are available for those devices). Upon verification, the operations may include providing a request to determine whether the other device (e.g., a called device with respect to a calling device) is registered with the service provider computer(s) 120 or is at least capable of implementing augmented services and/or the operations may include requesting augmented services from the service provider 120. When it is determined that augmented services are available for the devices, the operations may include augmenting the placed call with additional functionality and/or at least offering the augmented functionality options to the users 104, 106.

Further, in some examples, the operations may include receiving, from an application associated with the devices 100, 102, service registration information related to one or more services (e.g., specific applications of the devices 100, 102 that may be enabled by other service providers) utilized by the users 104, 106 of the devices and providing the service registration information to the service provider computer 120. By way of example, service registration information may include information related to one or more services (such as a video chat service, voice service, messaging service, location sharing service, or the like) utilized by users 110 on devices 100, 102, email address information, information related to the users, information identifying the user's device, or the like.

In some examples, one or more operations may then be performed by the devices 100, 102 to enable the users 104, 106 to receive from the service provider computer(s) 120, one or more augmented services for interaction between the users 104, 106 on the devices 100, 102. In some embodiments, the augmented services for interaction may be identified by the service provider computer(s) 120, based at least in part on the service registration information provided by the users. By way of example, if the service registration information provided by the users 104, 106 indicates that the users have subscribed to a particular video service and/or a messaging service, then the service provider computer(s) 120 may identify the particular video service and/or a messaging service as a service by which users 104, 106 may interact with each other.

In some examples, the operations performed by the devices 100, 102 may include displaying the identified augmented services (e.g., either identified based at least in part on user/device registration with the service provider computer(s) 120 and/or based at least in part on the service registration information) for interaction as one or more selectable UI elements 112, 114, 116 118 on the display screen 108 of the user devices 100, 102. In the illustrated example, the identified services include a messaging service provided by UI element 112, a voice chat service provided by UI element 114, a video chat service provided by UI element 116 and a location service provided by UI element 118. As described herein, messaging service 114 may enable users 104, 106 to send messages (e.g., e-mail, instant message, or fax) in real-time to each other while a cellular call is in progress and initiated by the cellular call as described. A voice chat service 114 (e.g., a voice over IP (VoIP) call) may enable the audio interaction in real-time between the users 104, 106 while the cellular call is in progress and initiated by the cellular call as described. A video chat service 116 may enable audio and video interaction in real-time between the users 104, 106 while the cellular call is in progress and initiated by the cellular call as described. A location sharing service 118 may enable the identification and/or sharing of the users' location by utilizing information from a variety of cellular networks, wireless networks, and/or GPS networks to determine the users' approximate location.

According to at least one embodiment, the operations performed by the devices 100, 102 may include providing the identified augmented service for interaction between the users 104, 106 as an audio message to the users 104, 106 of the devices.

In an example, the devices 104, 106 may come equipped with wearable devices such as a wearable personal communicator device that may be able to recognize an audio confirmation and/or a gesture from the users 104, 106 in order to receive a selection of an augmented service (e.g., a video call) by the users.

Thus, in some embodiments, alternatively or in addition to displaying identified augmented services as one or more UI elements and receiving a selection of an augmented service via a UI element on the display screen of the devices, the operations performed by the devices 100, 102 may also include identifying the augmented services by providing an audio message of the identified augmented services (e.g., via a microphone and/or a headset connected to the devices) to the users and receiving an audible confirmation and/or a gesture of a selected augmented service from the users.

Although FIG. 1 illustrates example UI elements 112, 114, 116 118, it should be appreciated that the user devices 100, 102 may be configured to enable the users 104, 106 to interact with each other using a variety of other services in addition to the services provided by the elements 112, 114, 116, 118, in other embodiments. For example, the user devices 100, 102 may be configured to enable the users 104, 106 to interact with each other using a variety of network services, including, but not limited to, picture sharing, email services, banking services, financial services, or the like. Additionally, in some embodiments, the UI elements in FIG. 1 may be implemented as a drop-down list, an icon, a menu selection, a control (widget), a text box, a radio button, a hyperlink, a check box, or the like.

In some aspects, the operations performed by the devices 100, 102 may include receiving a selection of an identified augmented service from the users 104, 106 via the elements 112, 11.4, 116, 118. For example, the users 104, 106 may select a service represented by one or more of the UI elements 112, 114, 116 and 118. In some examples, once the users 104, 106 have selected one of the augmented services, the devices 100, 102 may be configured to perform one or more operations to enable the users to interact with each other using the selected augmented service. The manner in which these operations are performed is discussed in detail in FIG. 2.

Figure 2:
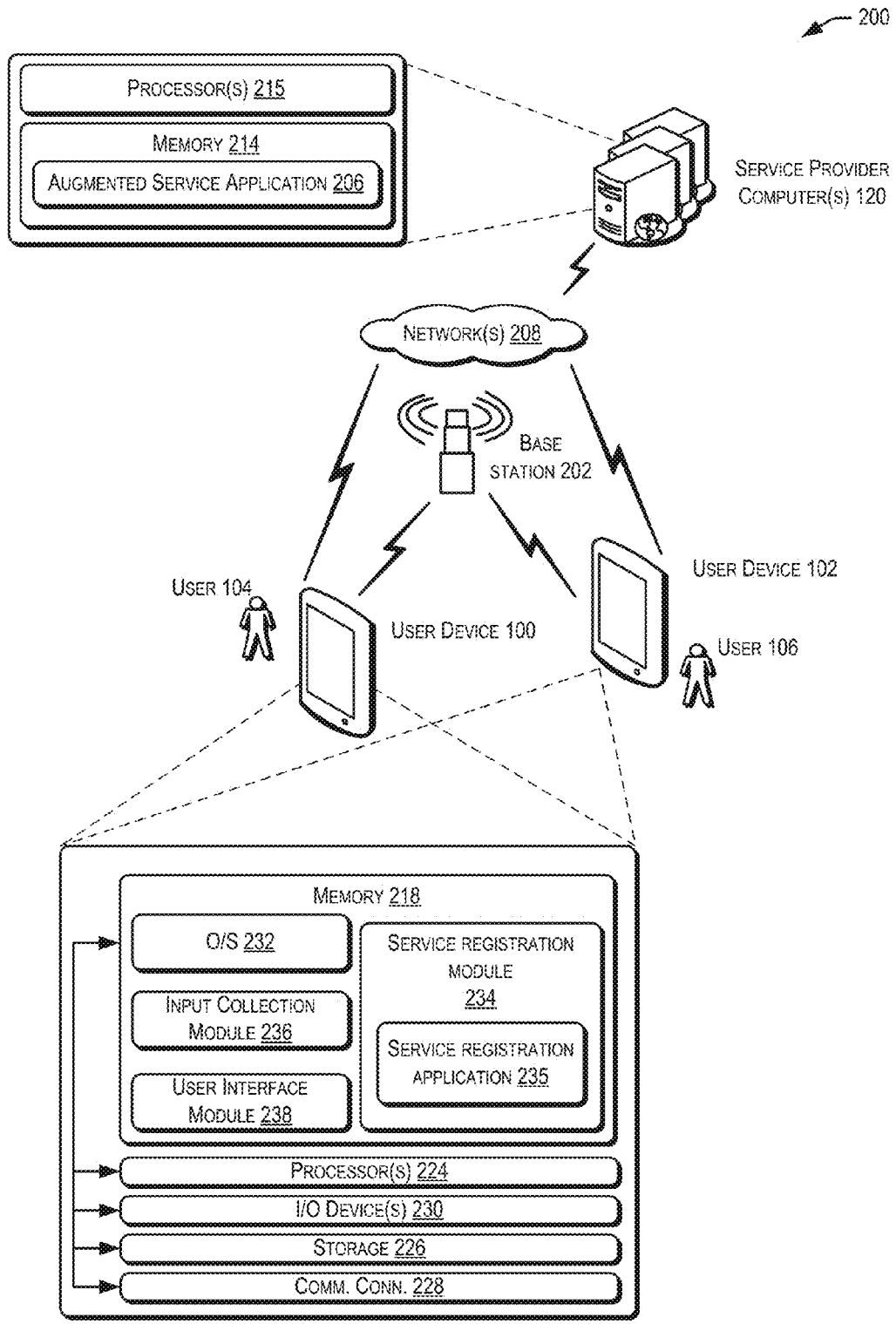
FIG. 2 illustrates an example network architecture in which techniques for interaction between users using one or more devices may be implemented.

FIG. 2 depicts an illustrative system or architecture 200 in which techniques for interaction between users using one or more devices may be implemented. In architecture 200, the users 104, 106 (e.g., device owners, account holders, etc.) may utilize the user computing devices 100, 102 to access local applications (e.g., stored and/or executable by the user devices 100, 102), an augmented service application 206 via one or more networks 208. In some aspects, the augmented service application 206 may be hosted, managed, and/or otherwise provided by a remote service, such as by utilizing one or more service provider computer(s) 120. The service provider computer(s) 120 may, in some examples, provide computing resources such as, but not limited to, applications for purchase and/or download, network sites, network hosting, data storage, etc. Although FIG. 2 depicts the interaction of two users 104, 106 using devices 100, 102, it should be appreciated that system 200 may be configured to enable the interaction of multiple users using multiple devices, in other embodiments. Additionally, architecture 200 may include abuse station 202 that provides wireless communication (e.g., via the wireless service provider network) between the devices 100, 102 to establish initial connectivity between the devices.

In some examples, the networks 208 may include any one or a combination of many different types of networks, such as cable networks, the Internet, wireless networks, cellular networks, and other private and/or public networks. The networks 208 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein. While the illustrated example represents the users 104, 106 accessing the web service application 206 over the networks 208, the described techniques may equally apply in instances where the users 104, 106 interact with the service provider computer(s) 120 via the user devices 100, 102 over a landline phone, via a kiosk, or in any other manner.

As described briefly above, the augmented service application 206 may allow the user devices 100, 102 to interact with the service provider computer(s) 120, such as to provide the augmented services noted above and/or to verify which augmented services are appropriate and/or available for each user device 100, 102. The service provider computer(s) 120, perhaps arranged in a cluster of servers or as a server farm, may host the augmented service application 206. Other server architectures may also be used to host the augmented service application 206. The augmented service application 206 may be capable of handling requests from many user devices and serving, in response, relevant augmented service information including, but not limited to, verification of registered accounts and/or instructions for performing the augmented services. As discussed above, the described techniques can similarly be implemented outside of the augmented service application 206, such as with other applications running on user devices 100, 102.

In some embodiments, upon verifying that the devices 100, 102 are registered with the service provider computer(s) 120, the augmented service application 206 may include one or more operations to identify one or more augmented services available for interaction between the devices 100, 102. The augmented service application 206 may further include operations to provide the identified augmented services to the users 104, 106 on the devices 100, 102. In some examples, the augmented service application 206 may execute one or more operations to provide one or more UI elements (e.g., 112, 114, 116, 118) on the display screen 108 of the devices 100, 102 wherein the UI elements enable the selection of an augmented service by the users 104, 106. The augmented service application 206 may further execute one or more operations to provide the selection of the augmented service by the users 100, 102 to the service provider computer(s) 120 and receive from the service provider computer(s) 120, instructions for implementing the augmented service. The operations may further instruct execution of the received instructions so that the connection between the users 104, 106 operating devices 100, 102 may be supplemented with the augmented service.

The service provider computer(s) 120 may be any type of computing device such as, but not limited to, a mobile phone, a smart phone, a personal digital assistant (PDA), a laptop computer, a desktop computer, an c-book reader, a server computer, a thin-client device, a tablet, etc. In some embodiments, service provider computer(s) 120 may be a local device accessible by the devices 100, 102 or may be located at a remote location from the devices 100, 102. Additionally, it should be noted that in some embodiments, the service provider computer(s) 120 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment. In some examples, the service provider computer(s) 120 may be in communication with the user devices 100, 102 via the networks 208, or via other network connections. The service provider computer(s) 120 may include one or more servers, perhaps arranged in a cluster, or as individual servers not associated with one another, or may be implemented as a web service consumable via the networks 208.

In one illustrative configuration, the service provider computer(s) 120 may include at least one memory 214 and one or more processing units (or processor(s)) 215. The memory 214 may store program instructions that are loadable and executable on processor(s) 215, as well as data generated during the execution of these programs. Depending on the configuration and type of the service provider computer(s) 120, the memory 214 may be volatile (such as random access memory (RAM)) and/or non-volatile (such as read-only memory (ROW, flash memory, etc.) The service provider computer(s) 120 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM. Turning to the contents of the memory 214 in more detail, the memory 214 may include an operating system and one or more application programs or services for implementing the features disclosed herein including at least the augmented service application 206.

In some examples, the user devices 100, 102 may also be any type of computing device such as, but not limited to, an e-book reader, a mobile phone, a smart phone, a PDA, a laptop computer, a thin-client device, a tablet, etc. In some examples, the user devices 100, 102 may be in communication with the service provider computer 120 via networks 208, or via other network connections.

In one illustrative configuration, the user devices 100, 102 may include at least one memory 218 and one or more processing units (or processor(s)) 224. The memory 218 may store program instructions that are loadable and executable on the processor(s) 224, as well as data generated during the execution of these programs. Depending on the configuration and type of the user devices 100, 102, the memory 218 may be volatile (such as random access memory (RAM)) and/or non-volatile (such as read-only memory (ROM), flash memory, etc.). The user devices 100, 102 may also include the additional storage 226, which may include removable storage and/or non-removable storage. The additional storage 226 may include, but is not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 218 may include multiple different types of memory, such as static random access memory (SRAM), dynamic random access memory (DRAM), or ROM.

The memory 218 and the additional storage 226, both removable and non-removable, are examples of non-transitory computer-readable storage media. For example, computer-readable storage media may include volatile or non-volatile, removable, or non-removable media implemented in any method or technology for storage of information such as computer-readable instructions, data structures, program modules, or other data. As used herein, modules may refer to programming modules executed by computing systems (e.g., processors) that are part of the user devices 100, 102 or the service provider computer(s) 120. The memory 218 and the additional storage 226 are all examples of computer storage media. The user devices 100, 102 may also contain communications connection(s) 228 that allow the user devices 100, 102 to communicate with a stored database, another computing device or server, user terminals, and/or other devices on the networks 208. The user devices 100, 102 may also include input/output (I/O) device(s) and/or ports 230, such as for enabling connection with a keyboard, a mouse, a pen, a voice input device, a touch input device, a display, speakers, a printer, etc.

Turning to the contents of the memory 218 in more detail, the memory 218 may include an operating system (OS) 232 and the one or more application programs or services for implementing the features disclosed herein including a service registration module 234, an input collection module 236, and/or a user interface module 238. Additionally, in some examples, as noted above, OS 232 may be configured with a handler (e.g., an event handler, an interrupt handler, or the like), for interrupting regular operations of the devices 100, 102 to perform alternative operations (e.g., launching a new application, overriding other operations, etc.). The handler may, in some examples, be configured to receive service registration information (e.g., from the service registration module 234 and/or the input collection module 240) and perform one or more operations (e.g., at the OS level) based at least in part on the received information. Additionally, in some examples, the handler may be configured to execute or otherwise manage functions of one or more (or various combinations) of the modules 234, 236, 238, as appropriate.

In one embodiment, the service registration module 234 may be configured to receive service registration information related to one or more client services (such as a video chat service, voice service, messaging service, location sharing service and the like) utilized by the users 104, 106 via a service registration application 235 viewable on the devices 100, 102. In some examples, the users 104, 106 may provide the service registration information via the service registration application 235. As discussed above, service registration information may include, for example, information related to the types of client services utilized by the users, the email address and/or login information used by the users to access the services, information identifying the user's device, and the like. The login information and/or an email address related to the users may, in some aspects, be stored in one or more storage locations such as, but not limited to, the memory 218, a database, or other storage location of the devices 100, 102 (or remote location).

In other embodiments, the service registration application 235 may be configured to automatically extract the service registration information from one or more applications related to the services, instead of obtaining the service registration information directly from users 104, 106.

In some examples, the applications related to the client services (e.g., text message applications, video calling applications, etc.) that users may wish to utilize on the devices 100, 102 may be automatically installed by the service registration module 234 (e.g., installing the applications with the OS 232), for example, as part of the registration with the service provider computer(s) 120. In other examples, the users 104, 106 may themselves download applications related to the client services that they wish to utilize from a network site (or combination of network sites) viewable via the user devices 100, 102 or via a network browser (e.g., a web browser) accessible by users 104, 106. According to at least one embodiment, the applications installed on the devices may be a part of the OS, a software library, or other software layer including the devices 100, 102.

When communication is established between the users 104, 106 on user devices 100, 102, (e.g., when the user 104 on the device 100 initiates a call with the user 106 on the device 102, via the wireless service provider network 202) the service registration application 235 in the service registration module 234 may be configured to automatically provide the service registration information to the augmented service application 206 in the service provider computer(s) 120. The augmented service application 206 may be configured to receive the service registration information from the user devices 100, 102. In some examples, the augmented service application 206 may be configured to automatically receive the service registration information when a call is initiated by the users 102, 104 of the devices 100, 102. In other examples, the augmented service application 206 may also be configured to receive the service registration information from the user devices 100, 102 on aperiodic basis, for example, by pinging the devices to obtain this information.

In some embodiments, upon receiving the service registration information related to the users from the user devices 100, 102, the augmented service application 206 may be configured to perform one or more operations to verify that the users 104, 106 are registered members of the respective client services. For example, if the service registration information from the users includes information related to a video chat service and a messaging service utilized by the users, then the augmented service application 206 may communicate with a particular service provider providing the video chat service and/or the messaging service to verify that the users are registered members of these client services.

Upon successful verification, the augmented service application 206 may then be configured to perform one or more operations to identify one or more services for interaction based at least in part on the service registration information provided by the users. As an example, if the service registration information provided by the users 104, 106 indicates that the users have subscribed to a particular video service and/or a messaging service, then the service provider computer(s) 120 may identify the particular video service and/or a messaging service as a service by which users 104, 106 may interact with each other.

In other embodiments, and as discussed above, the augmented service application 206 may also be configured to identify the client services that are available for interaction between the devices, without receiving service registration information of any particular client service from the user devices 100, 102. In this embodiment, the augmented service application 206 may be configured to automatically identify client services by which the devices may interact with each other based on a call initiated by the user 104 to the user 106. As an example, upon verifying that the devices 100, 102 are registered with the service provider computer(s) 120, the augmented service application 206 may provide augmented functionality by enabling or activating an augmented service such as a video session between the two devices, even though the user 104 of the device 100 may have initially only placed a call to the user 106 of the device 102.

The augmented service application 206 may then be configured to provide the identified augmented services to the users on the user devices 100, 102. In some embodiments, the augmented service application 206 may be configured to perform one or more operations to augment the call initiated by the user (e.g., user 104) with at least one or more of the identified augmented services by which the user (e.g., user 104) may interact with another user (e.g., user 106). Similarly, the augmented service application 206 may be configured to perform one or more operations to augment the call received by the other user (e.g., user 106) with at least one or more augmented services by which the other user (e.g., user 106) may interact with the user (e.g., user 104).

In some aspects, the operations performed by the augmented service application 206 to augment a call placed by the user with services for interaction may include providing the augmented services to the user interface module 238 on the user devices 100, 102. The user interface module 238 may be configured to display the identified services on the user devices 100, 102. In some examples, the augmented services may be displayed as selectable elements 112, 114, 116 and 118 that are overlayed on the display screen 108 of the user devices 100, 102. Additionally, in some examples, the user interface module 238 may be configured to provide two different configuration UIs, one within the OS settings and one within the application settings of each applications. However, in some examples, the application-specific settings may be configured via the OS settings UI.

The input collection module 236 may be configured to receive a selection of an augmented service from the users 104, 106 via the elements 112, 114, 116 and 118. In some aspects, the input collection module 236 may then be configured to automatically launch the application related to the selected augmented service on the user devices 100, 102 to enable the users 104, 106 to communicate with each other, via the selected augmented service. In some aspects, the users 104, 106 may interact with each other via the selected augmented service, while the call initiated by the user 104 to the user 106 is still in progress. In other embodiments, the input collection module 236 may be configured to provide the selected augmented service to the service provider computer 120, receive instructions for implementing the augmented service from the service provider computer 120, and execute the received instructions such that the connection is supplemented with the augmented service.

Further, in some examples, the user interface module 238 may be configured to indicate via a UI notification that a selection of a service was received from a user. In some examples, the user interface module 238 may be configured to automatically modify UI elements of the device such that elements may be removed (e.g., freeing up screen real estate) once a service has been selected by the user.

Additional types of computer storage media that may be present in the user device 100 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the user device 100. Combinations of any of the above should also be included within the scope of non-transitory computer-readable storage media.

A few additional examples of the operations of the user devices 100, 102 are also described in greater detail below with reference to at least FIGS. 3-9.

Figure 3:
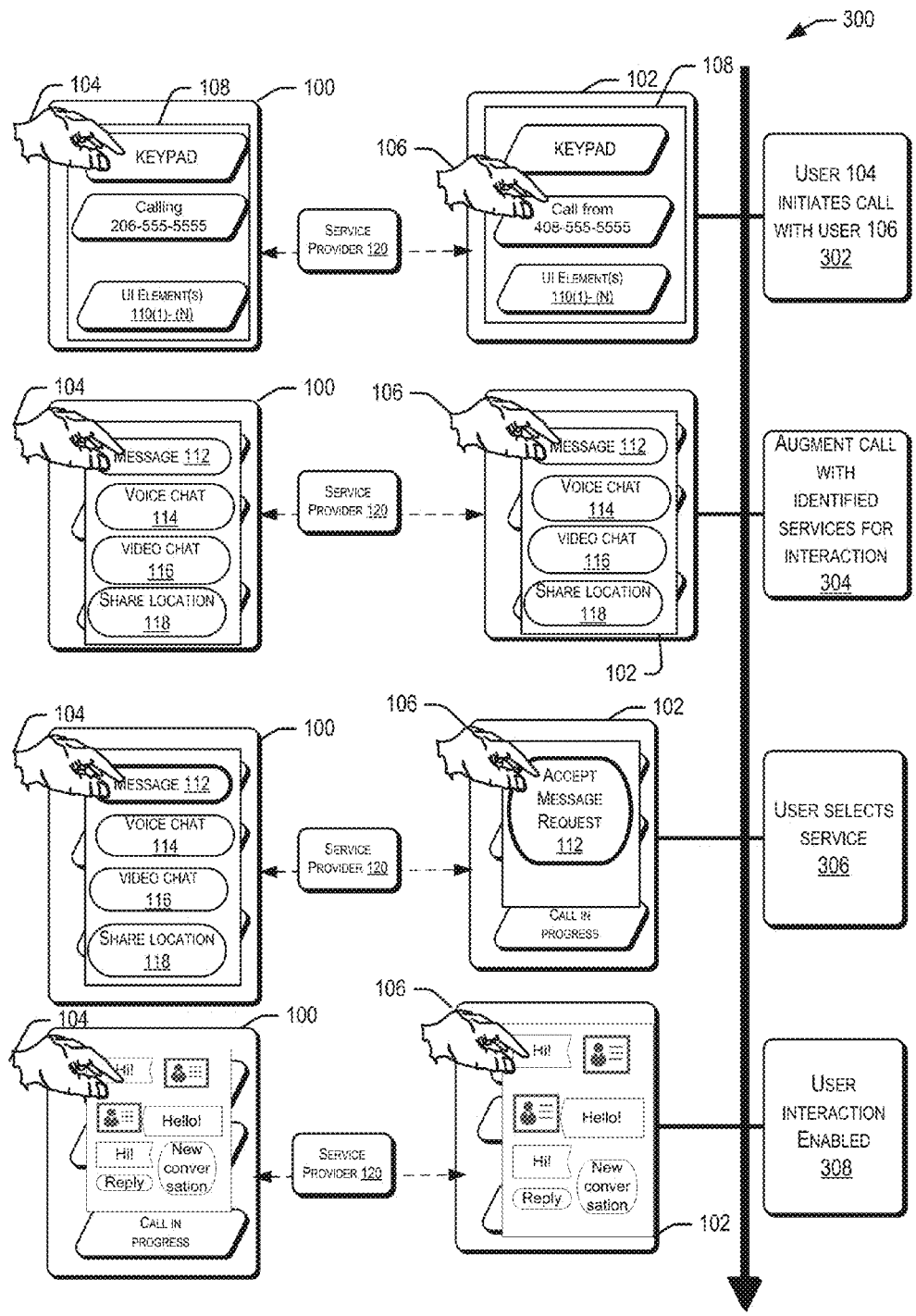
FIG. 3 illustrates an example flow with which techniques for enabling interaction between users using one or more services on devices may be implemented.

FIG. 3 depicts an illustrative flow 300 with which techniques for enabling interaction between users by providing one or more augmented services on devices, may be implemented. In illustrative flow 300, operations may be performed by one or more processors 224 of devices 100, 102 described with reference to at least FIGS. 1 and 2. Additionally, instructions for performing the operations may be stored in one or more memories 218 of devices 100, 102. As desired, the flow 300 may begin at 302, where a user 104 operating device 100 may interact with a user 106 operating device 102 by initiating a call to user 106. In at least one non-limiting example, user 104 may utilize the calling functionality provided by the device 100 and accessed by display screen 108 to place a call to user 106. As discussed above, the calling functionality may be implemented on user devices 100, 102 by a software program and/or application operating through a processor and/or may be implemented by the OS of user devices 100, 102. In other examples, the calling functionality may also be provided by a stand-alone application on user devices 100, 102.

In some examples, and as discussed with reference to FIGS. 1 and 2, upon call initiation, devices 100, 102 may be configured to perform one or more operations that include implementing augmented services based at least in part on instructions from the service provider 120. Additionally, or in the alternative, the devices 100, 103 may be configured to perform operations that include receiving, from an application (e.g., a service registration application) associated with the devices, service registration information related to one or more services utilized by users 104, 106 of the devices 100, 102 and providing the service registration information to the service provider computer 120.

In some examples, at 304 of the flow 300, upon successful verification of the services available and/or registered with the user devices, the call initiated by user 104 may be augmented with functionality that enables user 104 to interact with user 106 with one or more augmented services identified by the service provider computer 120. As illustrated, devices 100, 102 may display the identified augmented services as selectable UI elements 112, 114, 116 and 118 (e.g., overlayed on the display screen 108 of the devices).

At 306 of the flow 300, devices 100, 102 may receive a selection of an augmented service from the users 104, 106 via the UI elements 112, 114, 116 and 118. In the example illustration, at 306, the user 104 may select the UI element 112 to interact with the user 106 via a messaging service. In some examples, the user 106 may be presented with a UI element on the user device 104 which enables the user to accept the message request from the user 104. In some examples, the messaging service may include an in-line picture sharing facility, media sharing facility, file sharing facility and the like to enable the users 104, 106 to share pictures while communicating with each other via the messaging service.

According to at least one embodiment, the service provider computer 120 may provide the users 104, 106 on user devices 100, 102 with instructions that may enable the users to automatically connect with each other, based on a selected augmented service by one of the users.

According to at least one embodiment, the service provider computer 120 may provide the users 104, 106 on user devices 100, 102 with information that enables the users 104, 106 to configure the identified augmented services in a manner that enables the users to automatically interact with each other using the identified augmented services. As an example, the users may apply configuration settings to identified augmented services based on the type of the identified augmented service. For example, based on the process discussed in 306 above, the user 106 may have the ability to apply certain configuration settings so that the user 106 can automatically accept a message request 112 from the user 104 as opposed to having to select a UI element to manually accept the message request. In another example, the user 106 may apply configuration settings by which the user 106 may be provided with an opt-in UI element by which the user 106 may either accept or reject a request to interact with the user 104 via an identified augmented service (e.g., a video service).

In other embodiments, the service provider computer 120 may provide the users 104, 106 on user devices 100, 102 with information that enables the users 104, 106 to apply user-specific configuration settings to the identified augmented services. For example, the user 104 may apply a first set of configuration settings by which the user 104 can automatically share his location with the user 106 using an identified augmented service such as a location sharing service, but may apply a different set of configuration settings when other users request to view the location of the user 104. For example, other users may need to provide a confirmation of their identity prior to viewing the location of the user 104.

At 308 of the flow 300, a data connection may be established between the devices and the service provider computers 120 (e.g., a data connection from one device to the other, a data connection between each device and the service provider computers 120, or combinations of the like) to enable the users to interact with each other using the selected augmented service. In some examples, the users may continue to interact with each other using the selected augmented service, while the call between the users is still in progress. In other examples, the users may switch to the data connection to continue interaction using the augmented service.

In other examples, at 306 of the flow 300, the user 104 may also select one or more of the UI elements 114, 116 or 118 to interact with the user 106. For example, the user 104 may select the UI element 114 to interact with the user 106 via a voice chat service, the user 104 may select the UI element 116 to interact with the user 106 via a video chat service, or the user 104 may select the element 118 to interact with the user 106 via a location sharing service.

Figure 4:
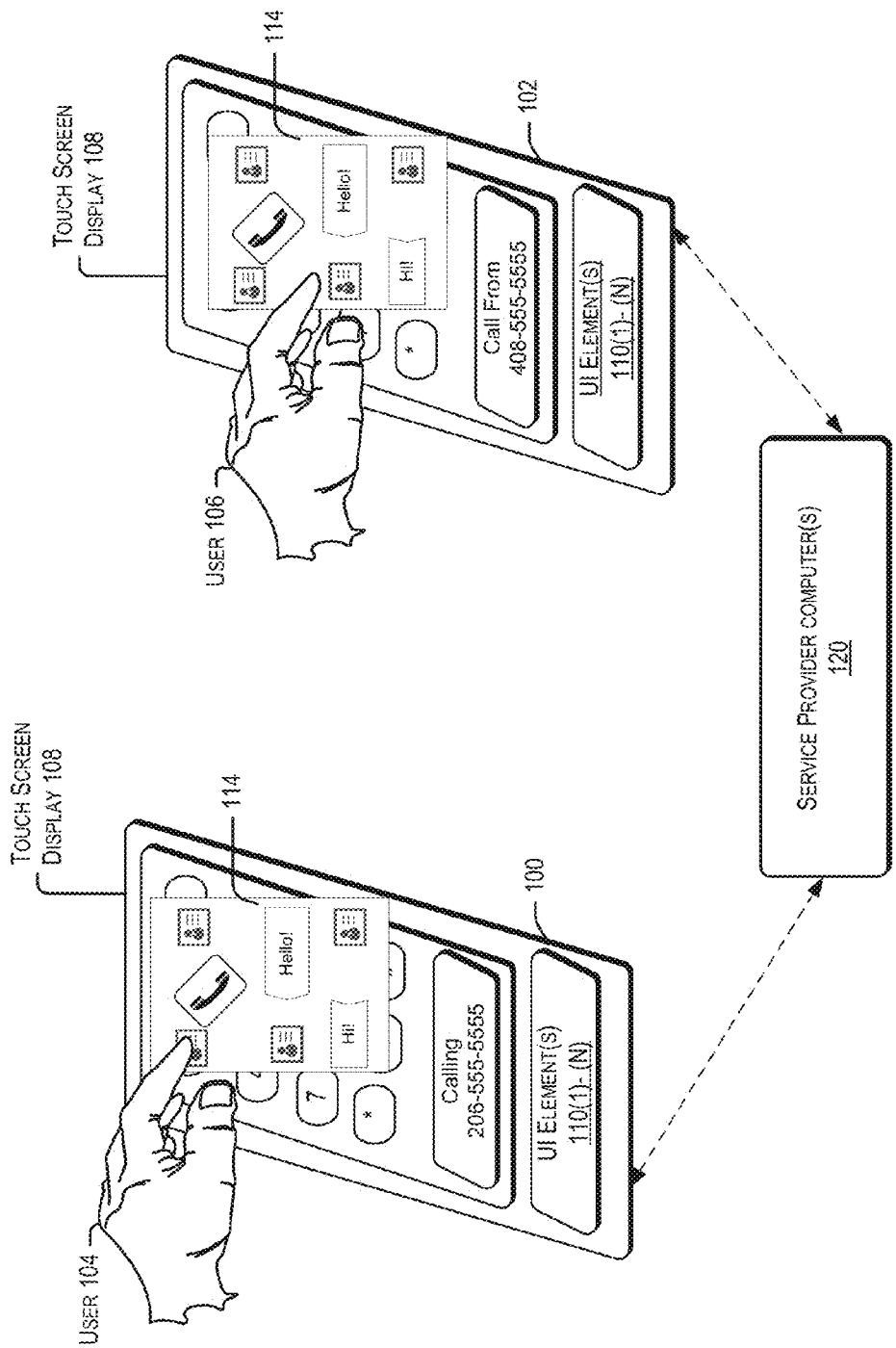
FIG. 4 illustrates a block diagram for describing the implementation of example techniques for enabling interaction between users using one or more services on devices may be implemented.

FIG. 4 is an example illustration by which a call initiated by a user may be augmented with functionality that enables users to interact with one another using a voice chat service, in accordance with an embodiment of the present disclosure. In some examples, the voice chat service may allow the users 104, 106 to communicate with each other by voice, in real-time, using voice communication services (e.g., VoIP) that enable the delivery of voice communications over the internet without the need for users to connect with each other using a cellular connection.

In certain embodiments, upon selection of the UI element 114 by the user 104, the voice chat service may display a UI element to the user 104, via the display screen 108. The user 104 may then click on a second UI element that identifies or otherwise displays a telephone number to initiate a VoIP call with the other user 106. The users 104, 106 may then communicate with each other using the augmented voice chat service using a microphone and/or an audio headset connected to the user devices 100, 102, without connecting with each other using a telephone set or a cellular device and/or independent of the cellular connection already established.

Figure 5:
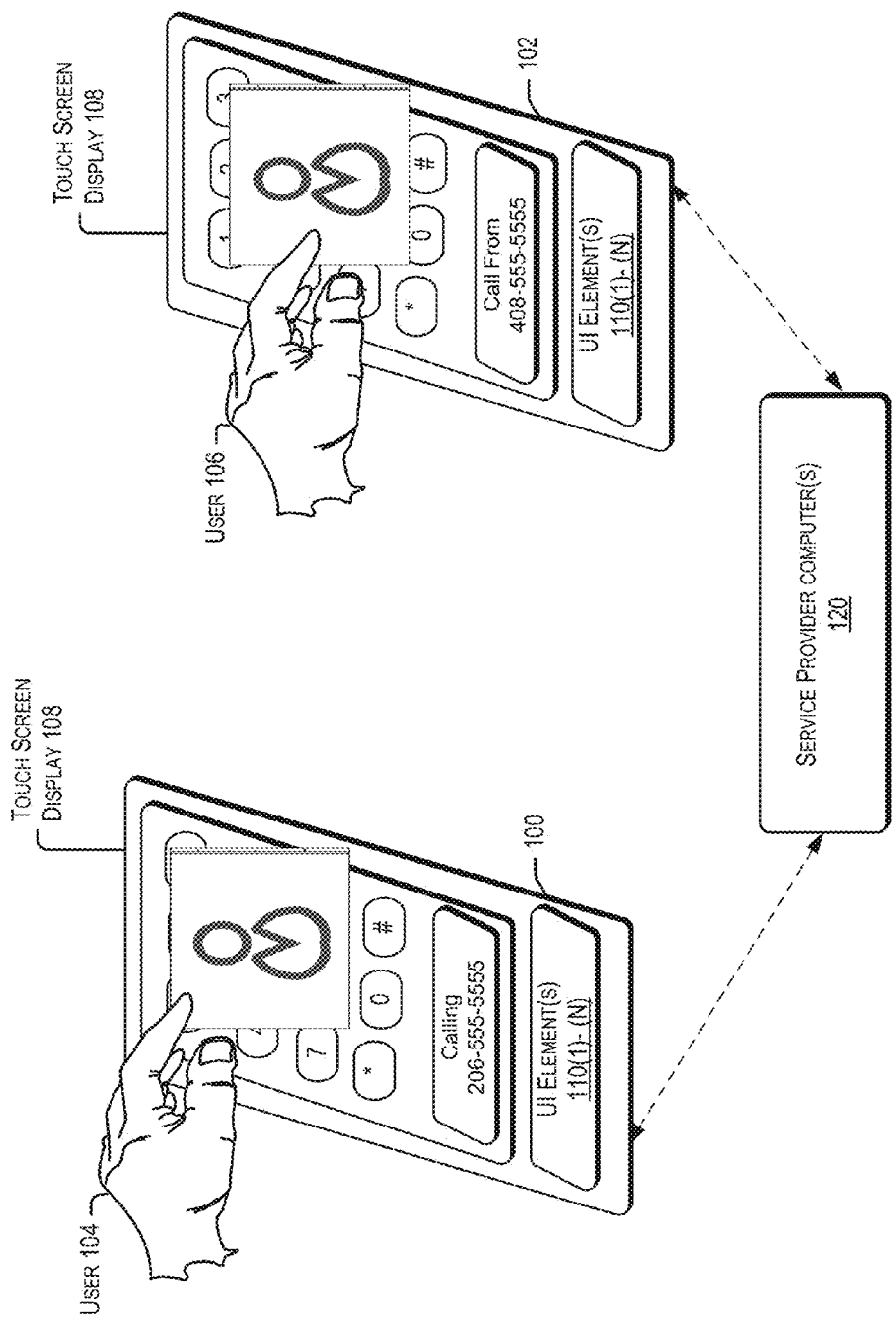
FIG. 5 illustrates another block diagram for describing the implementation of example techniques for enabling interaction between users using one or more services on devices may be implemented.

FIG. 5 is an example illustration by which a call initiated by a user may be augmented with functionality that enables users to interact with one another using a video chat service, in accordance with an embodiment of the present disclosure. In some examples, the video chat service may enable the simultaneous delivery of video and audio for communication between the users 104, 106, in real-time.

In certain embodiments, upon selection of the UI element 116 by the user 104, the video chat service may display a UI element to the user 104 via the display screen 108. The user 104 may then click on a second UI element that identifies or otherwise displays contact information identifying the other user 106 to initiate a video call with the user 106. In some examples, the user 104 may view a status icon displayed next to the contact address of the user 106 to determine if the user 106 is available to video chat with the user 104. If the status of the user 106 indicates that the user 106 is available to video chat with the user 104, then the user 104 may click on a call bar icon provided by the network page to call the user 106. The users 104, 106 may then interact with each other via the video chat service (e.g., independent of the cellular connection already established).

Figure 6:
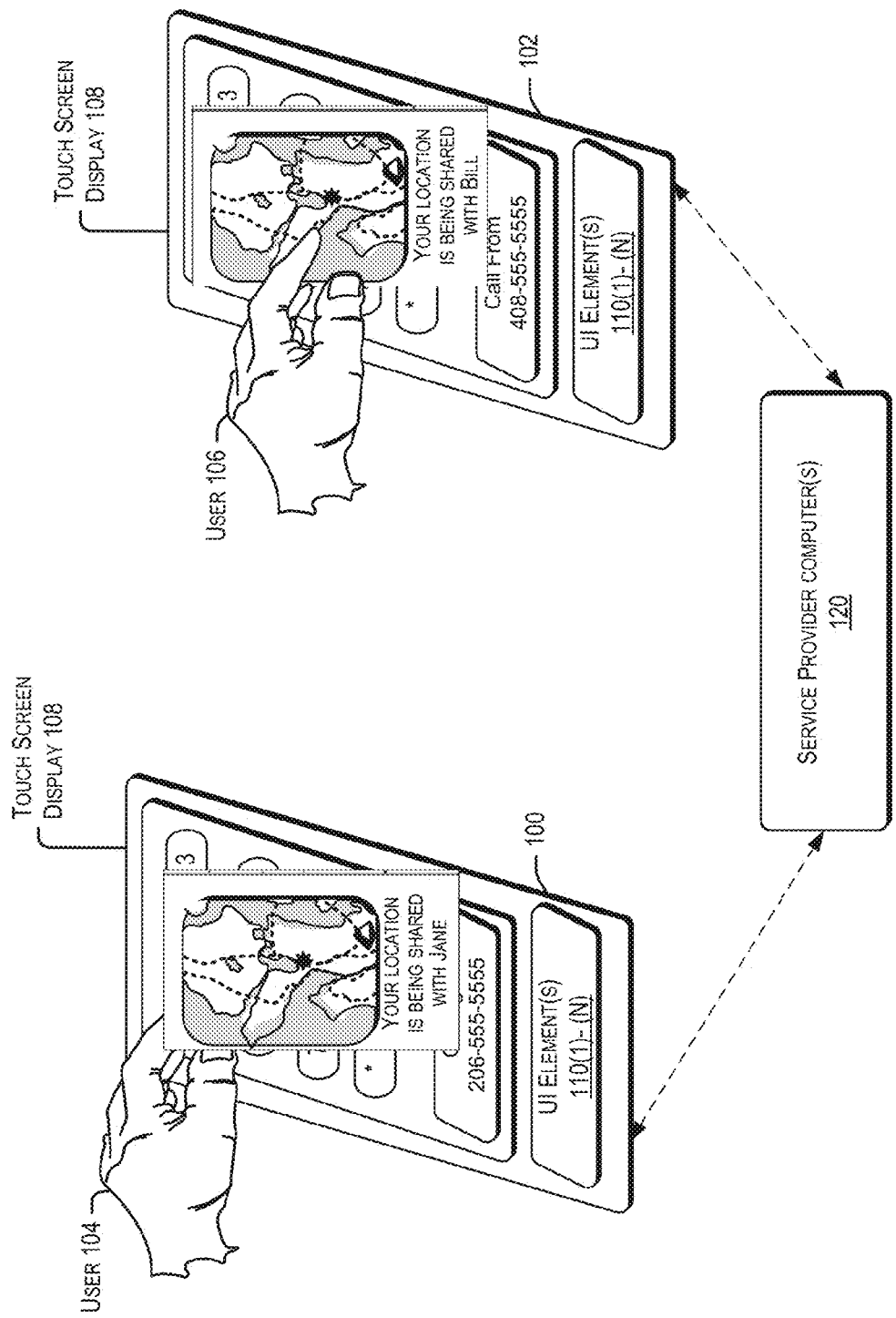
FIG. 6 illustrates another block diagram for describing the implementation of example techniques for enabling interaction between users using one or more services on devices may be implemented.

FIG. 6 is an exemplary illustration by which a call initiated by a user is augmented with functionality that enables users to interact with one another using a location sharing service, in accordance with an embodiment of the present disclosure. In some examples, the location sharing service may prompt users to determine if the users would like to continue sharing their location with each other even after the call placed by the users has ended. By way of example, the location sharing service may prompt users with a element such as "Continue sharing location?" on the display screen of the devices. The users may then select the element if they wish to continue sharing their location with each other for a specified period of time. Although the exemplary illustrations depicted in FIG. 3-6 illustrate an exemplary interaction of a user 104 initiating a call with a user 106, it is to be appreciated that user 106 may also initiate a call a call with user 104 to interact with user 104, in other embodiments.

Figure 7:
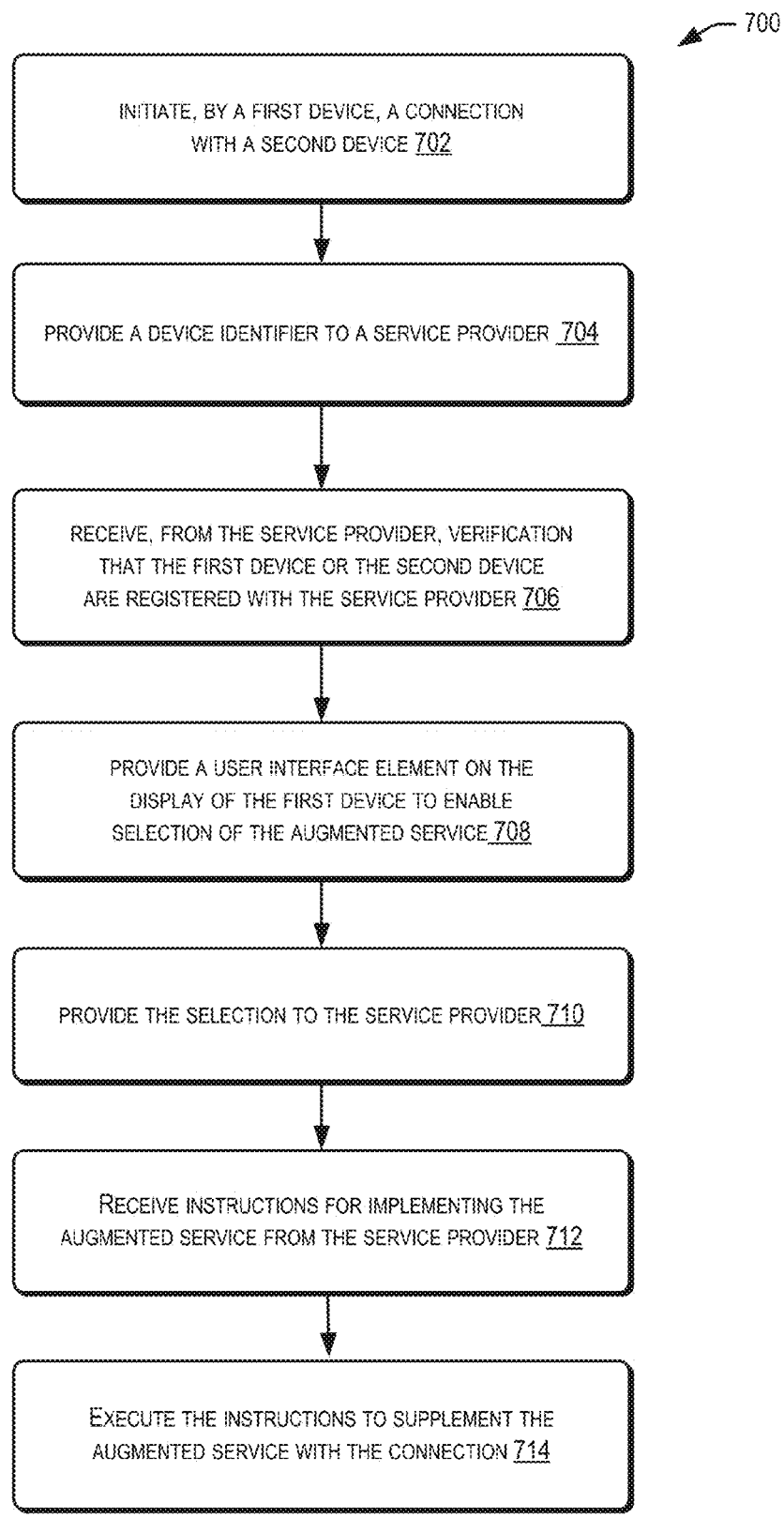
FIG. 7 illustrates a flow diagram of an example process 700 for enabling the interaction of users operating devices as described herein.
Figure 8:
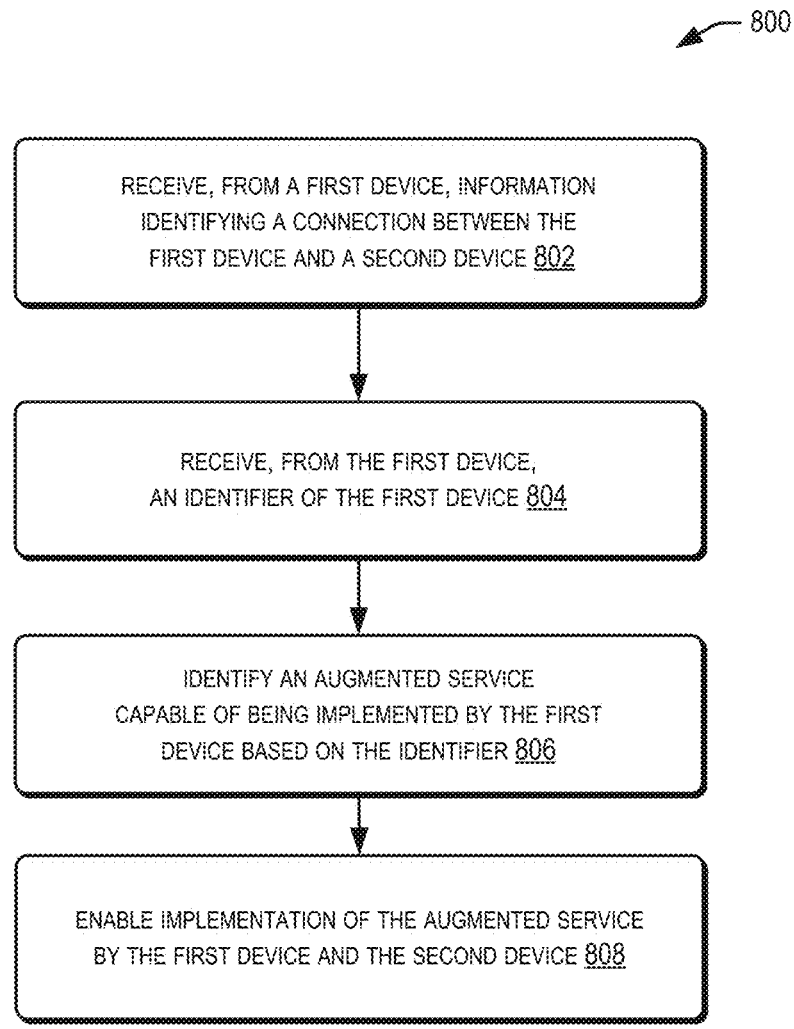
FIG. 8 illustrates another flow diagram of an example process 800 for enabling the interaction of users operating devices as described herein.
Figure 9:
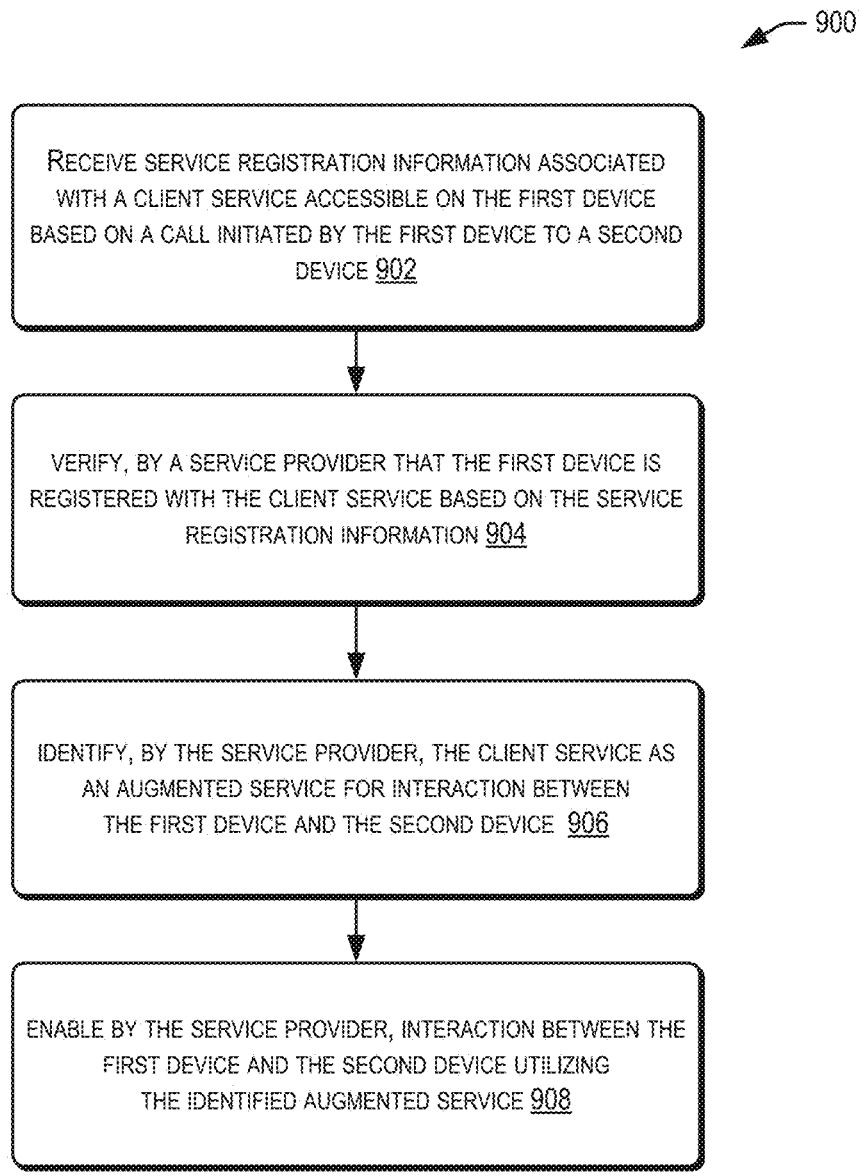
FIG. 9 illustrates another flow diagram of an example process 900 for enabling the interaction of users operating devices as described herein.

FIGS. 7-9 illustrate example flow diagrams showing respective processes 700, 800 and 900 for enabling the interaction of users operating devices, according to at least a any examples. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. The computer-readable storage medium may be non-transitory.

FIG. 7 illustrates a flow diagram of an example process 700 for enabling the interaction of users operating devices as described herein. The process at 700 may begin at 702 by including initiating, by a first device (e.g., 100), a connection with a second device (e.g., 102) based on a cellular network. At 704, the process may include providing a device identifier to a service provider (e.g., the service provider computer(s) 120). In one example, the device identifier may correspond to the cellular number of the first device. At 706, the process 700 may include receiving from the service provider computer(s) 120, verification that the first device or the second device is registered with the service provider. At 708, the process 700 may include providing a user interface element (e.g., 112, 114, 116, 118) on a display (e.g., 108) of the first device when the first device and the second device are verified as being registered with the service provider. In some examples, the user interface element may enable the selection of an augmented service of the first device. At 710, the process 700 may include providing the selected augmented service to the service provider computer(s) 120. At 712, the process 700 may include receiving the instructions from the service provider for implementing the augmented service. At 714, the process 700 may include executing the received instructions such that the connection is supplemented with the augmented service.

FIG. 8 illustrates a flow diagram of an example process 800 for enabling the interaction of users operating devices as described herein. The process at 800 may begin at 802 by including receiving, from a first device (e.g., 100), information identifying a connection between the first device and a second device (e.g., 102). At 802, the process 800 may include receiving, from the first device, an identifier of the first device. At 804, the process 800 may include identifying an augmented service capable of being implemented by the first device based at least in part on the identifier of the first device. At 806, the process 800 may include enabling implementation of the augmented service by the first device and the second device.

FIG. 9 illustrates an example flow diagram showing process 900 for enabling the interaction of users operating devices as described herein. The process at 900 may begin at 902 by including receiving, from an application installed on a first device (e.g., 100), service registration information associated with a client service accessible on the first device based at least in part on a cellular call initiated by the first device to a second device e.g., 102). At 904, the process 900 may include verifying, by a service provider (e.g., service provider computer(s) 120) external to the first device and the second device, that the first device is registered with the client service based at least in part on the service registration information. At 906, the process 900 may include identifying, by the service provider, the client service as an augmented service for interaction between the first device and the second device based at least in part on the verification that the first device is registered with the client service. At 908, the process 900 may include enabling, by the service provider, interaction between the first device and the second device utilizing the identified augmented service.

Illustrative methods and systems for enabling interaction between users operating devices are described above. Some or all of these systems and methods may, but need not, be implemented at least partially by architectures such as those shown at least in FIGS. 1-8 above.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NES, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm elements described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A device can also be implemented as a combination of computing devices, e.g., a combination of a DSP and a microprocessor, a plurality of microprocessors, one or more microprocessors in conjunction with a DSP core, or any other such configuration, Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
   a memory that stores computer-executable instructions; and
   a processor configured to access the memory, the processor configured to execute the computer-executable instructions to collectively at least:
   initiate, by a first device of the system, a first connection with a second device, the first connection established based at least in part on a network;
   provide a device identifier to a service provider, the device identifier corresponding to the first device;
   provide information comprising device capabilities of the first device;
   receive, from the service provider, verification that the first device or the second device are registered with the service provider;
   provide a user interface element on a display of the first device when the first device and the second device are verified as being registered with the service provider, the user interface element enabling selection of an augmented service to be implemented by the first device, the first device not installed with a client application that can perform the augmented service, the augmented service comprised of at least one of a video call service, a text messaging service, a voice over Internet Protocol (IP) service, or a location-based service;
   at least in response to selection of the augmented service, provide the selection to the service provider;
   receive, from the service provider, instructions for implementing the augmented service on the first device based at least in part on the information; and
   execute the received instructions such that the first connection is supplemented with the augmented service via a second connection that is independent from the first connection.

2. The system of claim 1, wherein the connection comprises at least one of a cellular call or a voice call between the first device and the second device.

3. The system of claim 1, wherein the device identifier comprises at least one of a cellular number of the first device, an Internet Protocol (IP) address of the first device, an email address associated with the first device, an International Mobile Equipment Identifier (IMEI) or a user identifier associated with a user of the first device.

4. The system of claim 1, further comprising executable instructions to enable a user of the first device to interact with the at least one other user operating the second device using the selected augmented service while the first connection is in progress.

5. A system comprising:
   a memory that stores computer-executable instructions; and
   a processor configured to access the memory, the processor configured to execute the computer-executable instructions to collectively at least:
   receive, from a first device, information identifying a first connection between the first device and a second device;
   receive, from the first device, an identifier of the first device;
   receive, from the first device, information including device capabilities of the first device;
   identify an augmented service capable of being implemented by the first device based at least in part on the identifier of the first device, the first device not installed with a client application that can perform the augmented service, the augmented service comprised of at least one of a video call service, a text messaging service, a voice over Internet Protocol (IP) service, or a location-based service; and
   enable implementation of the augmented service by the first device and the second device via a second connection that is independent from the first connection, the enabling of implementation of the augmented service being based at least in part on the information.

6. The system of claim 5, wherein the processor is further configured to execute the computer-executable instructions to collectively at least enable the first device and the second device to establish the second connection for implementing the augmented service when it is determined that at least one of the first device or the second device are registered with a service provider.

7. The system of claim 6, wherein establishing the second connection is enabled by providing instructions to at least one of the first device or the second device, the instructions configuring the respective first device or the respective second device to establish the second connection.

8. The system of claim 6, wherein the second connection comprises a data connection.

9. The system of claim 6, wherein the implementation of the augmented service is enabled via the second connection.

10. The system of claim 5, wherein the processor is further configured to execute the computer-executable instructions to collectively at least receive an indication of a selection of the augmented service from the first device, the indication identifying a user interface (UI) element selected by a user of the first device.

11. The system of claim 5, wherein the augmented service capable of being implemented by the first device is identified based at least in part on a service registration application configured to receive service registration information associated with one or more client services of the first device.

12. The system of claim 11, wherein the processor is further configured to execute the computer-executable instructions to collectively at least verify that a user of the first device is a registered member of the one or more client services of the first device based at least in part on the service registration information.

13. The system of claim 5, wherein the information further includes a list of capabilities provided by hardware elements of the respective first device or the respective second device by which the first device interacts with the second device using the augmented service.

14. The system of claim 5, wherein the implementation of the augmented service is enabled by providing, to at least one of the first device or the second device, instructions to configure the respective first device or the respective second device to implement the augmented service utilizing hardware of the respective first device or the respective second device.

15. A computer-implemented method comprising:
receiving, at a service provider, information identifying a cellular connection between a first device and a second device;
receiving, from the first device, an identifier of the first device;
receiving, from the first device, information including device capabilities of the first device;
identifying an augmented service of a plurality of augmented services capable of being implemented by the first device based at least in part on the identifier of the first device, the first device not installed with a client application that can perform the augmented service, the augmented service comprised of at least one of a video call service, a text messaging service, a voice over Internet Protocol (IP) service, or a location-based service;
enabling the first device and the second device to establish a data connection for implementing the augmented service when it is determined that at least one of the first device or the second device are registered with the service provider; and
enabling implementation of the augmented service by the first device and the second device independent of the cellular connection, the enabling of implementation of the augmented service being based at least in part on the information.

16. The computer-implemented method of claim 15, wherein the augmented service is identified based at least in part on the identifier of the first device being associated with the augmented service of the plurality of augmented services, the identifier of the first device being associated with a registration of the identifier of the first device.

17. The computer-implemented method of claim 15, wherein the first device is capable of implementing the augmented service when the first device has registered with the client application of the first device that can perform the augmented service.

18. The computer-implemented method of claim 15, wherein the first device is capable of implementing the augmented service when the first device comprises hardware components capable of being controlled to perform the augmented service.

19. The computer-implemented method of claim 18, wherein enabling the implementation of the augmented service comprises providing, by the service provider, instructions to the first device to control the hardware components.

20. A non-transitory computer-readable medium storing computer-executable instructions that, when executed by a computer system, configures the computer system to perform operations comprising:
receiving, from an application installed on a first device, service registration information associated with a client service accessible on the first device based at least in part on a wireless call initiated by the first device to a second device;
receiving, from the second device, information including device capabilities of the second device;
verifying, by a service provider external to the first device and the second device, that the first device is registered with the client service based at least in part on the service registration information;
identifying, by the service provider, the client service as an augmented service for interaction between the first device and the second device based at least in part on the verification that the first device is registered with the client service; and
enabling, by the service provider, interaction between the first device and the second device utilizing the identified augmented service via another connection independent of the wireless call, the enabling of interaction between the first device and the second device includes providing instructions to the second device to implement the augmented service based at least in part on the information, the second device not installed with a client application that can perform the augmented service, the augmented service comprised of at least one of a video call service, a text messaging service, a voice over Internet Protocol (IP) service, or a location-based service.

21. The non-transitory computer-readable medium of claim 20, wherein enabling the interaction between the first device and the second device comprises providing instructions to the first device and the second device to access the client service utilizing a data connection independent of the wireless connection.

* * * * *